United States Patent
Doebbeling et al.

(10) Patent No.: US 10,222,067 B2
(45) Date of Patent: Mar. 5, 2019

(54) COMBUSTOR FOR A SEQUENTIAL GAS TURBINE HAVING A DEFLECTION UNIT BETWEEN FIRST AND SECOND COMBUSTION CHAMBERS

(71) Applicant: ANSALDO ENERGIA SWITZERLAND AG, Baden (CH)

(72) Inventors: Klaus Doebbeling, Windisch (CH); Ewald Freitag, Baden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 188 days.

(21) Appl. No.: 14/574,978

(22) Filed: Dec. 18, 2014

(65) Prior Publication Data
US 2015/0176842 A1    Jun. 25, 2015

(30) Foreign Application Priority Data
Dec. 24, 2013  (EP) .................................... 13006011

(51) Int. Cl.
*F23R 3/36*    (2006.01)
*F23R 3/42*    (2006.01)
(Continued)

(52) U.S. Cl.
CPC ............... *F23R 3/36* (2013.01); *F02C 6/003* (2013.01); *F23R 3/02* (2013.01); *F23R 3/16* (2013.01);
(Continued)

(58) Field of Classification Search
CPC ...... F23R 3/02; F23R 3/16; F23R 3/18; F23R 3/20; F23R 3/286; F23R 3/34;
(Continued)

(56) References Cited

U.S. PATENT DOCUMENTS 3,937,008 A    2/1976  Markowski et al.
4,709,546 A   12/1987  Weiler
(Continued)

FOREIGN PATENT DOCUMENTS

CN    103256632        8/2013
DE    100 43 933 A1    3/2002
(Continued)

OTHER PUBLICATIONS

Original WO 03/038253 A1.*
(Continued)

*Primary Examiner* — Scott Walthour
(74) *Attorney, Agent, or Firm* — Buchanan Ingersoll & Rooney PC (57) ABSTRACT

The invention provides a new path of combustion technology for gas turbine operation with multifuel capability, low emissions of $NO_x$ and CO and high thermal efficiency. Further to the present invention providing a method for operating a combustor for a gas turbine and a combustor for a gas turbine are disclosed. The combustor includes a first combustion chamber with a wide operating range, a subsequent deflection unit for deflecting the hot gas flow of the first combustion chamber at least in circumferential direction and components for injecting and mixing additional air and/or fuel, and a sequential combustion chamber with a short residence time, where the temperature of the hot gases reaches its maximum.

26 Claims, 5 Drawing Sheets

(51) Int. Cl.
  *F23R 3/34* (2006.01)
  *F23R 3/28* (2006.01)
  *F23R 3/02* (2006.01)
  *F23R 3/18* (2006.01)
  *F23R 3/20* (2006.01)
  *F23R 3/16* (2006.01)
  *F02C 6/00* (2006.01)

(52) U.S. Cl.
  CPC ............... *F23R 3/18* (2013.01); *F23R 3/20* (2013.01); *F23R 3/286* (2013.01); *F23R 3/34* (2013.01); *F23R 3/346* (2013.01); *F23R 3/42* (2013.01); *F23R 2900/00015* (2013.01); *F23R 2900/03341* (2013.01)

(58) Field of Classification Search
  CPC .. F23R 3/346; F23R 3/42; F23R 2900/03341; F23R 3/36; F02C 6/003; F02C 6/02
  See application file for complete search history.

(56) References Cited

U.S. PATENT DOCUMENTS

| | | | |
|---|---|---|---|
| 5,454,220 A * | 10/1995 | Althaus | F02C 6/003 60/39.17 |
| 5,494,438 A * | 2/1996 | Yang | F02K 7/105 431/350 |
| 5,885,068 A * | 3/1999 | Dobbeling | F23R 3/42 431/116 |
| 6,735,949 B1 | 5/2004 | Haynes et al. | |
| 6,951,108 B2 | 10/2005 | Burrus et al. | |
| 9,062,886 B2 | 6/2015 | De La Cruz Garcia et al. | |
| 9,568,198 B2 | 2/2017 | Duesing et al. | |
| 2004/0103663 A1 | 6/2004 | Haynes et al. | |
| 2005/0034458 A1 | 2/2005 | Burrus et al. | |
| 2011/0179800 A1 | 7/2011 | De La Cruz Garcia et al. | |
| 2012/0260622 A1 * | 10/2012 | Poyyapakkam | F23C 5/08 60/39.465 |
| 2012/0297787 A1 * | 11/2012 | Poyyapakkam | B01F 5/0451 60/772 |
| 2013/0167546 A1 | 7/2013 | Chin | |
| 2015/0007547 A1 | 1/2015 | Duesing et al. | |

FOREIGN PATENT DOCUMENTS

| | | | | |
|---|---|---|---|---|
| EP | 1 371 906 A2 | 12/2003 | | |
| EP | 2 348 256 A1 | 7/2011 | | |
| WO | WO 03038253 A1 * | 5/2003 | | F02C 6/003 |
| WO | 2006/053825 A1 | 5/2006 | | |
| WO | 2011/054757 A2 | 5/2011 | | |
| WO | 2011/054766 A2 | 5/2011 | | |
| WO | 2011/061059 A2 | 5/2011 | | |
| WO | 2013/139914 A1 | 9/2013 | | |

OTHER PUBLICATIONS

Machine-Generated English Translation of Description from WO 03/038253 A1.*
Examination Report dated Jan. 14, 2018 by the GCC Patent Office in corresponding GC Application No. 2014-28636 (3 pages).
European Search Report dated May 7, 2015 by the European Patent Office in European Application No. 14 19 8539 (3 pages).
First Office Action dated Apr. 27, 2018 by the State Intellectual Property Office of the People's Republic of China in corresponding Chinese Patent Application No. 201410812622.4 (26 pages).
Office Action (Communication pursuant to Article 94(3) EPC) dated May 8, 2018, by the European Patent Office in corresponding European Patent Application No. 14 198 539.0-1009. (7 pages).

* cited by examiner

COMBUSTOR FOR A SEQUENTIAL GAS TURBINE HAVING A DEFLECTION UNIT BETWEEN FIRST AND SECOND COMBUSTION CHAMBERS

CROSS-REFERENCE TO RELATED APPLICATIONS

This application claims priority to European application 13006011.4 filed Dec. 24, 2013, the contents of which are hereby incorporated in its entirety.

TECHNICAL FIELD

The invention relates to a method for operating a combustor for a gas turbine with multifuel capability, an increased thermal efficiency and reduced emissions of $NO_x$ and not fully oxidized fuel, particularly CO. In addition, the invention relates to a combustor for a gas turbine.

BACKGROUND

In known gas turbines—both aircraft engines and stationary gas turbines for generation of electricity—the fuel is more or less completely converted into combustion products, mainly $CO_2$ and $H_2O$, within the combustion chamber. In a guide vane row, downstream of the combustion chamber, the exhaust gases are accelerated and deflected towards at least one blade row to perform mechanical work. Usually a couple of vane and blade row stages are subsequently arranged to exploit the kinetic and thermal energy of the hot gas flow.

The maximum temperature reached in the combustion chamber and the residence time of the combustion products in the combustion chamber dictate the undesired production of $NO_x$ and CO. Less important parameters for the generation of nitrogen oxides are the pressure in the combustion chamber and the fuel composition.

It is known per se to achieve a substantial local reduction of the maximum combustion temperature and the residence time at this temperature and thus the formation of undesired nitrogen oxides by improving the quality of mixing of fuel and air, including homogenization of fuel and air mixture within a premixing burner or swirl generator elements or between individual burners or swirl generator elements, or by reducing the leakage of air and heat loss of the combustion chamber or by reducing the residence time of the hot combustion gases in the combustion chamber. Such improvement measures become increasingly challenging and the achievable $NO_x$ reductions become smaller.

The reduction of $NO_x$-formation through a reduction in the residence time is limited, because CO-emissions increase at part load.

One way for reducing the combustion temperature while maintaining the same rotor inlet temperature is to cool the turbine vanes with a closed cooling circuit, using steam as a coolant.

Disadvantages of this method are the complexity of an additional cooling management, the additional costs and a to a certain degree lower reliability and availability of the system.

WO 2006/053825 and DE 10043933 describe a combustor to achieve reduced pollutant emissions, particularly $NO_x$, by a first combustion chamber with a relatively low residence time with the consequence of an incomplete burnout, a first vane row downstream of the first combustion chamber, and following a second combustion zone, a sequential combustion chamber, with or without injection of additional fuel and with sufficient residence time for complete burnout. Said first vane row aligns the flow of the hot combustion gases in axial direction. In addition, the gas flow is accelerated with the consequence of a significant reduction of its temperature. Accordingly, the temperature in the second combustion zone is lower than in the first combustion chamber. This lower temperature level is matched with the parameters of NOx-formation. In this way, a significant reduction of NOx-formation is reached.

WO 2011/061059 relates to a reheat combustor for a gas turbine. This document discloses features, how to cool the first and the sequential combustion chamber by cooling air, which is subsequently supplied to the combustion chamber and premixed with fuel. The goal is to reduce the difference between combustor exit temperature and the maximum temperature in the premixed flame to a minimum, thus reducing the strongly temperature dependent $NO_x$-formation.

SUMMARY

The invention provides a new functional principle of sequential combustion technology for gas turbine operation, based on premixed combustion with multifuel capability, that allows combustion with very low emissions of $NO_x$ and very low emissions of not fully oxidized fuel, particularly CO, at high outlet temperatures of 1820 K or more at the sequential combustion chamber.

According to the present invention a method for operating a combustor for a gas turbine and a combustor for a gas turbine are disclosed, the combustor at least comprising a first combustion chamber with a wide operating range, a subsequent deflection unit for deflecting the hot gas flow of the first combustion chamber at least in circumferential direction and including means for injecting and mixing additional air and/or fuel, and a sequential combustion chamber, where the temperature of the hot gases reaches its maximum, whereby in the first combustion chamber the premixed fuel air mixture is combusted in a stable flame at an average flame temperature in the range between 1400K and 1800K to allow CO-emissions and NOx-emissions below 10 vppmd at the exit of the first combustion chamber, at the downstream end of the first combustion chamber a mass flow of additional air is injected into the hot gas flow in order to reduce the temperature below 1400 K, preferably below 1350 K, which allows the injection of additional fuel downstream of said air injection, generating a mixture of hot exhaust gas, air and fuel with auto ignition times between 1 ms and 10 ms, wherein said mixture enters the deflection unit and is deflected there at least in a circumferential direction, but is not reacting until reaching the sequential combustion chamber, where the mixture is burned by autoignition and/or a combination of auto-ignition and recirculation of hot reaction products.

According to a first preferred embodiment the first combustion chamber is a premix combustor with an operating range between 1550 K and 1800 K (relating to the average flame temperature), more preferably between 1600 K and 1800 K.

According to another embodiment the residence time in the first combustion chamber is 15 ms to 30 ms.

According to a particularly preferred embodiment the residence time in the first combustion chamber is approximately two to five times longer than the residence time in the sequential combustion chamber with a residence time of about 3 ms to 10 ms.

According to a first aspect, the injection of additional air in the exit area of the first combustion chamber allows an operation of this first combustor at high enough temperatures for stable CO emissions on a low level.

According to a second aspect, this injection moderates the temperature of the exhaust gas to a temperature level low enough to avoid an immediate autoignition within 1 ms, but high enough to have an autoignition within 3 ms to 10 ms, with the consequence of an autoignition not before reaching the sequential combustion chamber.

According to a third aspect, this reduction of the hot gas temperature in front of the deflecting and accelerating vanes in the deflection unit makes it possible to eject only very small amounts of cooling air into the through flow in a range of less than 4% of the through flow. As a consequence the aerodynamic losses in the deflecting and accelerating vanes can be reduced to a minimum (reduced mixing losses, thinner trailing edges of the vanes).

According to another important embodiment downstream of the mixing section, i.e. in an upstream section of the sequential combustion chamber, the hot gas flow (mixture of exhaust, air and fuel) passes an area of a sudden cross-sectional enlargement, such as a backwards facing step. A reverse flow zone is generated after the step, wherein this reverse flow zone defines a flame anchoring point at the entry into the sequential combustion chamber.

The generation of a recirculation zone in the upstream section of the auto ignited sequential combustion chamber allows that, apart from the auto ignited reaction front, propagating flame fronts which mix reaction products with the unreacted educts of the mixture of exhaust, fuel and air are generated. As a consequence the location of heat release in the sequential combustion chamber is more stable in time as well as in space and in addition shows less variance for a varying fuel composition or first combustor exit temperature.

All these effects allow a very broad operation range of the combustion system with reference to pressure, inlet and outlet temperature variation, fuel composition).

The high entry temperature level in the sequential combustion chamber allows complete combustion of the mixture of fuel and air and exhaust from the first combustor within a very short residence time. As a consequence, the $NO_x$- and CO-levels at the end of the sequential combustor are at the same level as at the end of the first combustor, i.e. CO emissions <10 vppmd or at equilibrium CO levels and NOx emissions <10 vppmd.

Regarding multifuel capability of the combustion system according to the invention there are options: both the first combustor and the second combustor are operated with gaseous fuel as well as with liquid fuel or both the first combustor and the second combustor are operated with gaseous fuel and the first combustor may additionally be operated with liquid fuel or both the first combustor (1) and the second combustor (3) are operated with liquid fuel and the first combustor (1) may additionally be operated with gaseous fuel.

BRIEF DESCRIPTION OF THE DRAWINGS

In the following the invention will be described in greater detail by means of exemplary embodiments with reference to the accompanying drawings, in which.

DETAILED DESCRIPTION

Figure 1:
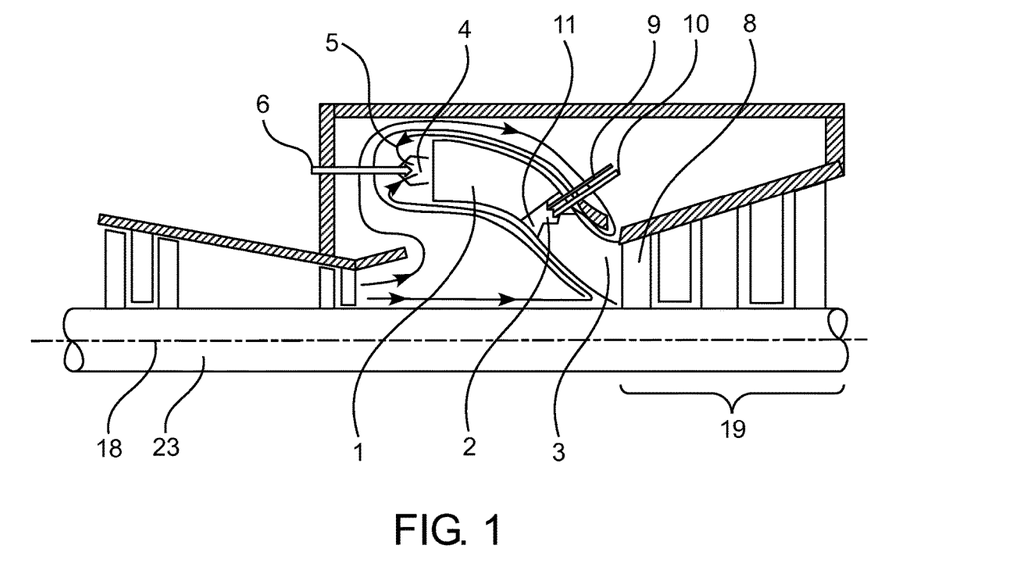
FIG. 1 illustrates in a schematic way a first embodiment of a combustion chamber with an integrated deflection unit.

FIG. 1 shows in a schematic way a longitudinal sectional view of a gas turbine with a reheat combustion system. The gas turbine comprises a compressor, the combustion system 1, 2, 3, 4, 5, 6, 9, 10 and a turbine 19, extending circumferentially around a rotor 23 with a rotational axis 18 and at least a first row of turbine blades 8. The combustion system comprises an integrated deflection unit 2 between a first combustion chamber 1 and a sequential combustion chamber 3. The first combustion chamber 1 is a premix combustor with a number of annularly arranged premixing burners 4, each burner 4 connected to a plenum for supplying combustion air 5 and to one or more fuel supply lines 6 for liquid and/or gaseous fuel. The sequential combustion chamber 3 is based on auto-ignition. The first vane row 11 of the turbine 19 is integrated into the combustion system in a position far upstream from the first blade row 8. In this position the first vane row 11 separates the sequential combustion chamber 3 from the first combustion chamber 1. This first vane row 11 acts as deflection and mixing unit 2, as described below. As can be seen from FIGS. 1 and 2 the first vane row 11 is positioned on a significantly larger radius (compared to the rotational axis 18) than the first turbine blade row 8 and the sequential combustion chamber 3 is used as a transition piece to compensate the difference in the radii.

In operation of the gas turbine combustion air is compressed by the compressor and supplied to the premixing burners 4, fuel is injected into the air and a fuel-air mixture is generated and burnt downstream of the burners 4 in a combustion zone 7 of the first combustion chamber 1. The temperature of the reaction products at the exit of the first combustion chamber 1 is in the range between about 1450 K and 1780 K, which allows a stable combustion with low emissions ($NO_x$<10 vppmd and CO<10 vppmd) over the entire operating range and which is suitable for both gaseous fuels (natural gas, hydrogen, synthesis gas, etc.) and liquid fuels (oils). The combustor residence time is preferably below 30 ms.

Figure 2:
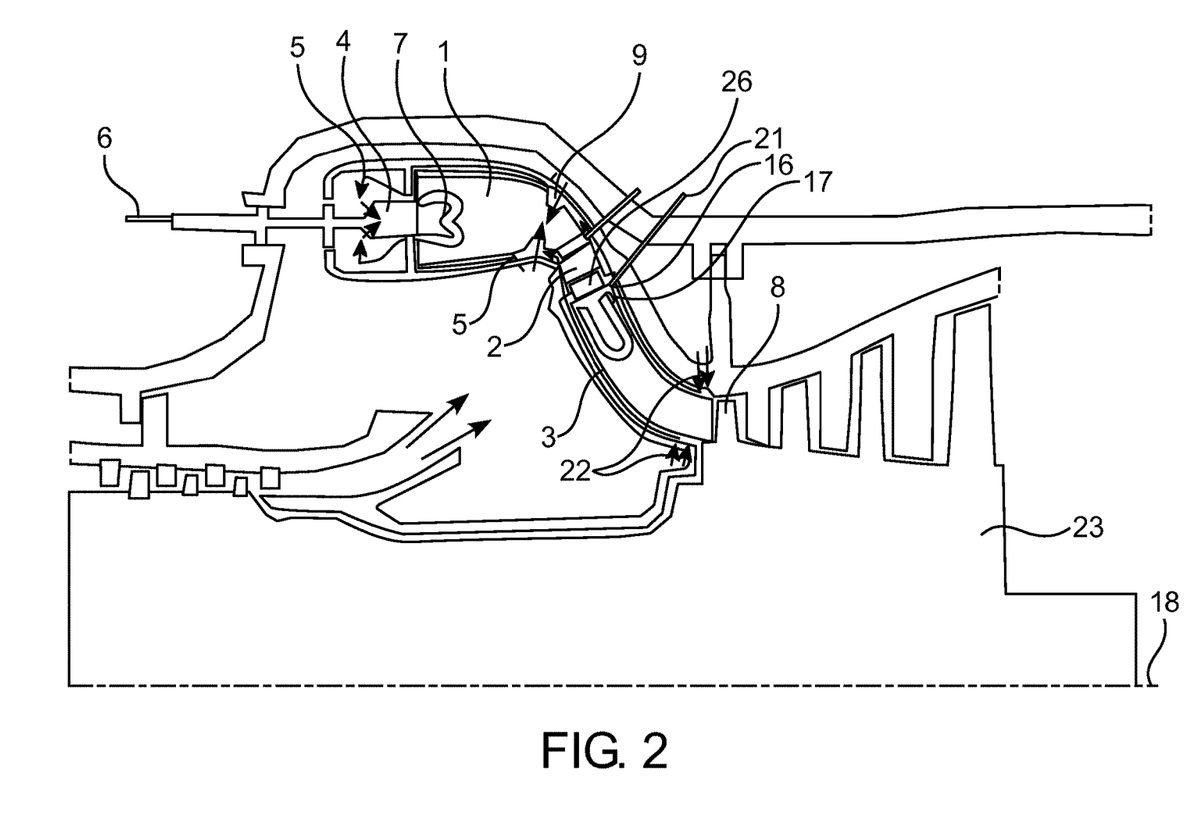
FIG. 2 shows a another embodiment of a combustion chamber according to the invention.

At a downstream end of the first combustion chamber 1 and upstream of the first vane row 11 means are positioned for injecting a mass flow of additional air 9 into the hot gas flow (see FIG. 2). By this additional mass flow of fresh air 9 the temperature of the resulting exhaust-air mixture is significantly reduced at the outlet of the first combustion chamber 1.

In the subsequent deflection unit 2 the mixture of exhaust and air passes the first vane row 11 and is deflected in at least a circumferential direction. To reduce the thermal stress of the vanes 11, they are made of a high temperature resistant material, e.g. a ceramic coating, and in addition they are equipped with an internal cooling system. Cooling of the vanes 11 may be realized with convective cooling inside the vane 11 and/or film cooling and/or impingement cooling, as known per se from state of the art turbine vanes. Alternatively, embodiments with closed cooling systems, e.g. with steam or air as a coolant, are possible.

As a consequence of the injection of additional air 9 and the heat transfer from the hot gas flow to the components in the deflection unit 2, the addition of approximately 3% to 5% of cooling and leakage air to the hot gas flow and acceleration in the deflection unit 2, the static temperature of the hot gas flow is significantly reduced to a level of less than 1350 K. This reduced temperature allows the injection of a mass flow of additional fuel 10, generating an exhaust-air-fuel mixture with auto ignition times between 1 ms and 10 ms such that this mixture is not reacting until it reaches the sequential combustion chamber 3, where it is burnt by auto ignition or a combination of auto ignition and recirculation of hot reaction products.

A fuel injection system 10, 24 and an aerodynamic mixing device 12, 13 with a subsequent mixing passage 26 are integrated into the deflection unit 2.

In order to improve the penetration depth of the jets of the additional fuel 10 a system of supporting air jets may be used. There is also the option to enclose the individual fuel jets in jets of air to prevent the ignition of the fuel prior to mixing with the exhaust gas from the first combustion chamber 1. Due to the high temperature, the mixture ignites due to auto-ignition and burns completely within a few milliseconds, typically within less than 10 ms.

Figure 3A:
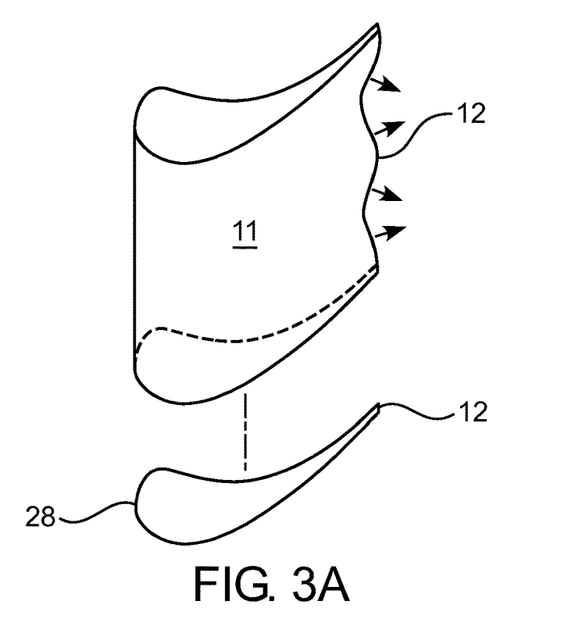
FIGS. 3a and 3b show vanes with a corrugated (FIG. 3a) or lobed (FIG. 3b) trailing edge for enhancing the formation of vortices in the hot gas flow.
Figure 3B:
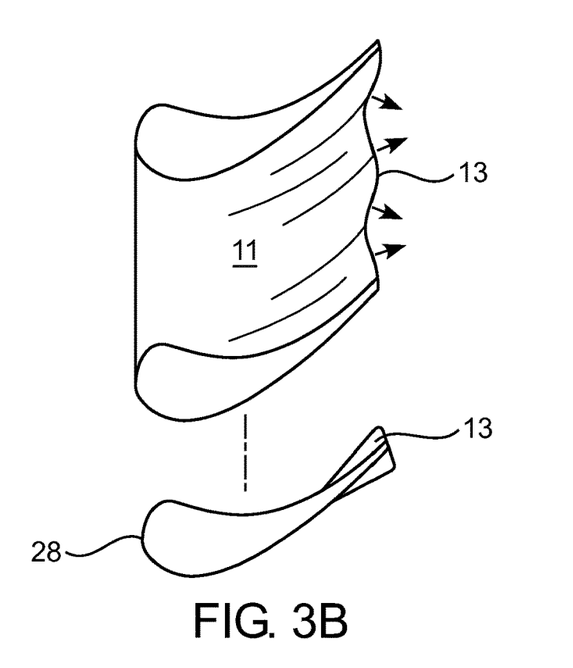
Figure 4:
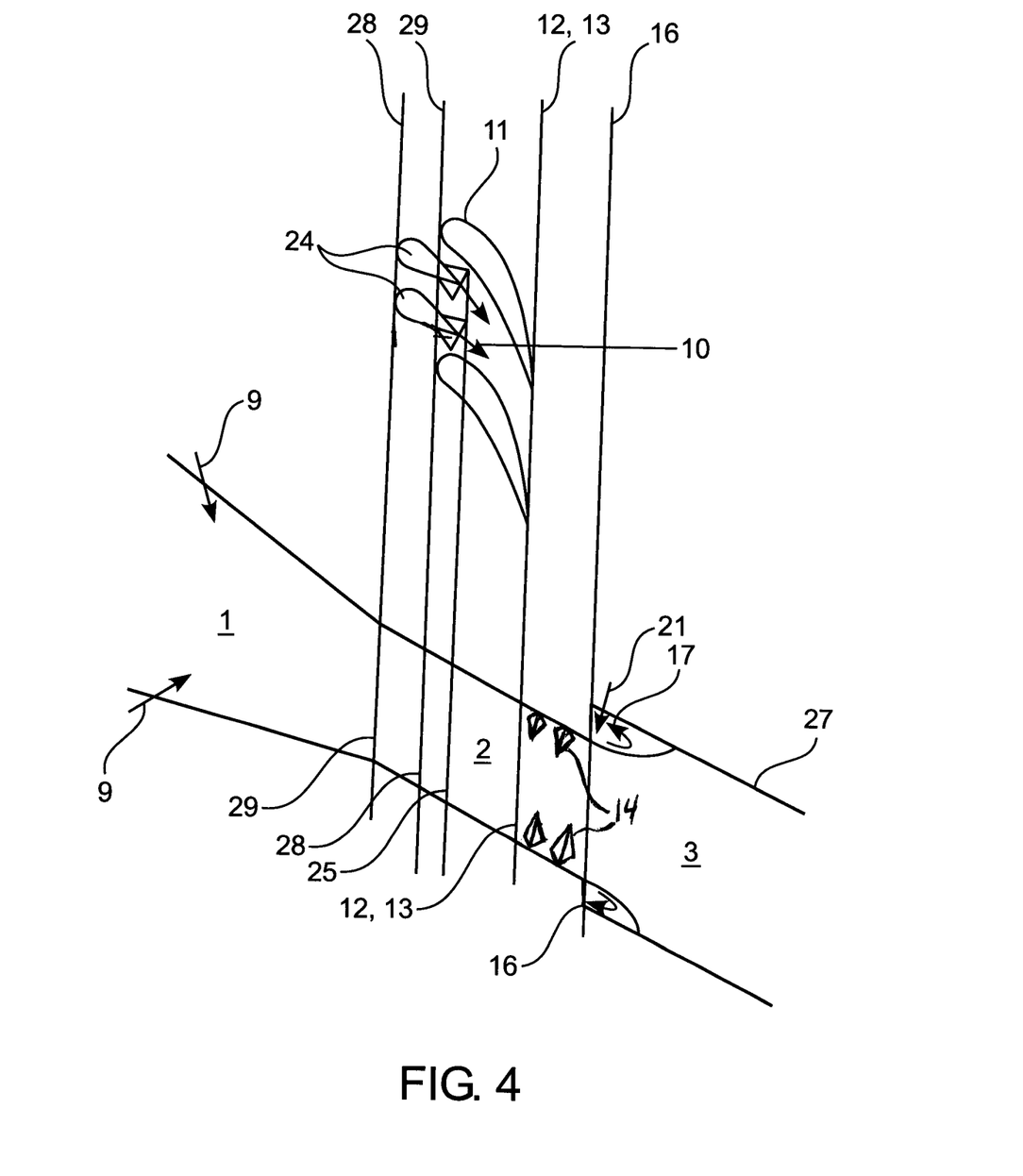
FIG. 4 illustrates schematically a combustion chamber with step expansion into the sequential combustor.

Options for fuel injection 10 include
Injection from the trailing edge of the deflection vanes 11 (see FIG. 3a, 3b)
Injection from the pressure or suction side of the guide vanes 11
Injection from the hub side or housing side of the flow channel within the deflection section 2
Injection from a separate fuel injection system 24, 25, integrated into the deflection unit 2, preferably directly upstream of the guide vane row 11 (FIG. 4). Such fuel injection means 24, 25 are known per se. They may be designed as streamlined bodies having leading and trailing edges 28, 29 and extending across the entire flow cross section. Such means are disclosed, for example, in patent application WO 2011/054757.

Combinations of two or more of these listed options are possible.

The mixture quality of the hot gas, the additional air 9 (from cooling air, carrier air, support air) and the additional fuel 10 is improved by the generation of vortices, preferably vortices with a vortex axis in flow direction. These vortices can be generated by different methods in or directly downstream of the deflection section 2, namely Use of vanes 11 with a corrugated trailing edge 12 (see FIG. 3a)
Use of vanes 11 with a lobed trailing edge 13 (see FIG. 3b)
Use of vortex generators 14 (FIG. 4), e.g. tetrahedrons on the hub side or casing side of the flow channel contour within deflection section 2 downstream of the vanes 11.
Aerodynamic design of the vanes 11 such that the secondary vortex flows occurring anyway due to the flow deflection are strengthened. Unlike a deflection design without fuel injection (in which the secondary vortex is avoided, if possible), the secondary vortices are amplified by the shape of the vane and the boundary contour on hub and casing side.

Figure 5A:
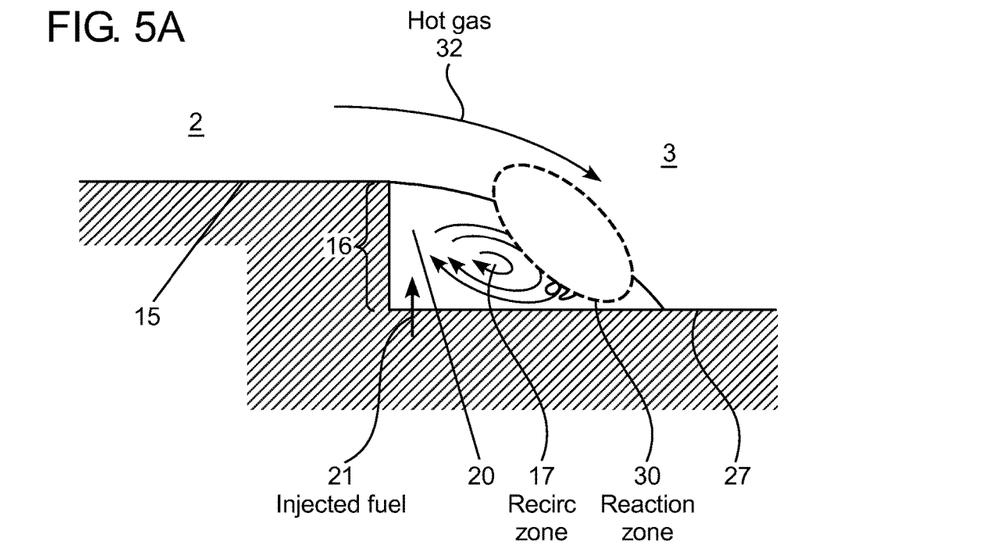
FIGS. 5a and 5b show in more detail embodiments of a sudden enlargement of the flow cross section.
Figure 5B:
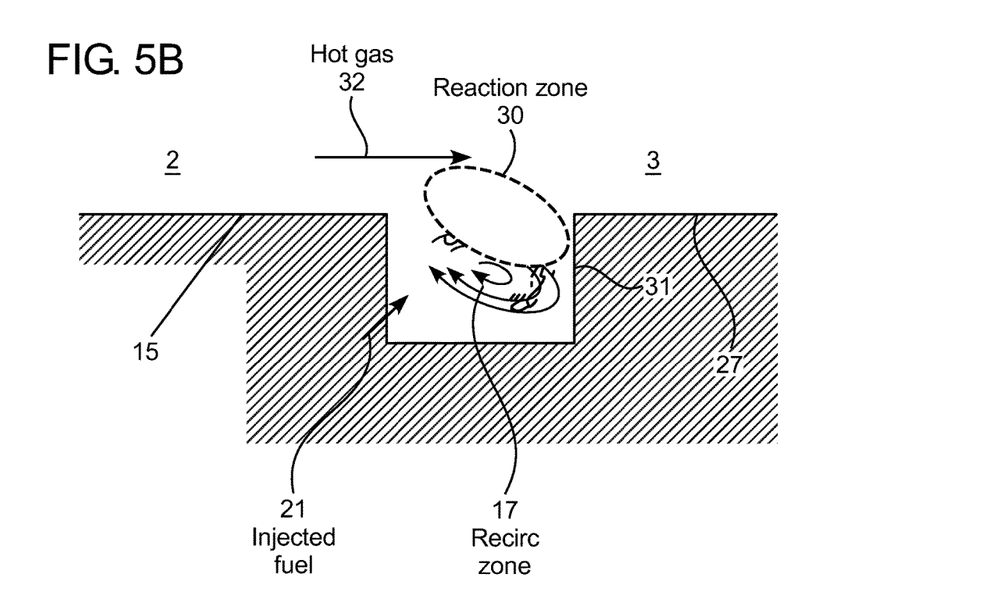

To expand the operating range a sudden cross-sectional enlargement 16 of the hot gas flow channel, the hot gas flow 32 passes a backwards facing step 20 or a recessed ring channel 31 in the flow channel contour 15 is arranged after the mixing section 26 in the inlet section of the sequential combustion chamber 3 (see FIGS. 4 and 5).

A reverse flow zone 17 is generated at the step 16. By forming a reaction zone 30 this reverse flow zone 17 defines a flame anchoring point at the inlet to the sequential combustion chamber 3 and thus a wide operating range in temperature, pressure, flow rate, oxygen content, fuels with different ignition properties etc. is achieved.

According to a preferred embodiment the said step of sudden flow cross-section enlargement comprises an expansion of flow cross-section of at least 10%.

To further enhance the operation range another fuel injection system 21 can be included into the backward facing step 16 or recessed ring channel 31 at the entry into the second combustor 3 (FIG. 4). By injecting fuel in this recirculation zone 17 downstream of the backward facing step 16 or into the recessed ring channel 31 the temperature in the recirculation zone 17 is increased by combustion of the additionally injected fuel 21.

The sequential combustion chamber 3 is preferably cooled by convective heat transfer, i.e. the combustor walls are cooled on the side opposite to the hot gas with cooling medium, preferably air, not directly flowing into the combustion chamber, as known per se.

The sequential combustion chamber 3 is preferably cooled by convective heat transfer, i.e. the combustor walls 27 are cooled on the side opposite to the hot gas with cooling medium 22, preferably air, not directly flowing into the combustion chamber, as known per se.

According to a preferred embodiment of the invention the first combustion chamber 1 is designed as an annular combustor and the sequential combustion chamber 3 is designed as an annular combustor too.

According to an alternative embodiment the first combustion chamber 1 is designed in a can combustor configuration and the sequential combustion chamber 3 is designed as an annular combustion chamber.

The deflection unit 2 including the mixing system can be implemented either as an annular ring around the turbine axis 18 or as individual burners or cans arranged around the turbine axis 18.

In order to reduce the axial length of the sequential combustor 3, the flow can be decelerated without generating flow separation in a diffuser-like combustor shape and then be accelerated again before entry into the turbine 19 rotor.

In the sequential combustion chamber 3 the temperature of the hot gases reaches its maximum. Therefore, the residence time in the combustion chamber 3 needs to be kept small, preferably less than 10 ms to reduce $NO_x$ formation.

Another way to reduce $NO_x$ formation in the combustion chamber is the reduction of the oxygen content in the hot combustion gases. This may be achieved by another option, namely exhaust gas recirculation. For example, partial mass flow of the exhaust gas is withdrawn after the turbine 19 or the heat recovery steam generator (not shown), is cooled down and afterwards mixed into the inlet air flows 5, 9 of the gas turbine.

For an optimization of the aerodynamics, i.e. lower pressure losses, it is advantageous to place the deflection unit 2, therewith the first vane row 11 on a significantly larger diameter (relating to the turbine axis 18) than the first turbine blade row 8 and to use the sequential combustor 3 as a transition piece to compensate the difference in the radii between deflection unit 2 and first turbine blade row 8. This measure results in the additional advantage that the circumferential velocity increases inversely with the radius, obeying the conversation of swirl, for the same axial velocity and thus the flow angle or deflection at the rotor inlet is substantially larger than the deflection in the deflection unit 2. Since the flow losses depend strongly on the deflection in the guide vanes 11, the losses can be reduced while maintaining a constant flow angle at the turbine rotor inlet.

Alternatively, the flow velocity in the deflection unit 2 is reduced proportionally in the radially outwardly offset guide baffle for the radius ratio for the same deflection tangential to axial velocity ratio.

Since heat transfer decreases approximately proportional to the flow rate, this embodiment requires less cooling of the components of the deflection unit 2.

At gas turbine start-up the first combustion chamber 1 is ignited by an ignition device and running up—by applying commonly used methods of operation, like increase in combustion temperature and increased mass flow rate—to a combustor exit temperature suitable for the ignition of the sequential combustor. Due to the wide controllable range of the first combustion chamber 1, variations in the auto-ignition characteristics of the fuel can be compensated by a higher or lower inlet temperature into the deflection unit 2, e.g. allowing operation on typically more reactive fuel.

To simplify the system, operation on liquid backup fuel may be limited to the first combustion chamber 1 at the expense of a certain power loss. If liquid fuel is used as the main fuel, the combustor may be built exclusively for liquid fuel.

The invention claimed is:

1. A method of operating a combustor arranged in a gas turbine of a power plant, the combustor including, in a direction of combustion gas flow through the combustor, a first combustion chamber, a deflection unit provided in a flow path through the combustor and configured to receive combustion gas flowing from the first combustion chamber, and a sequential combustion chamber, wherein the first combustion chamber is a premix combustion chamber with at least one premixing burner configured to inject a mixture of air and fuel into a combustion zone of said first combustion chamber, the fuel comprising a gaseous fuel or a liquid fuel the deflection unit including a row of guide vanes, the deflection unit further including vortex generating elements and a plurality of streamlined bodies configured to inject fuel into the combustion gas flow, wherein the deflection unit is positioned on a larger radius relative to a turbine axis, than a radius on which a downstream turbine blade row is positioned, wherein the plurality of streamlined bodies are disposed upstream of the row of guide vanes and wherein the vortex generating elements are arranged downstream of the row of guide vanes on a hub side and/or on a casing side of a flow channel contour, the flow channel contour defining the flow path through the combustor, wherein the sequential combustion chamber is an auto-ignition combustion chamber and is connected to the downstream turbine blade row, wherein an upstream section of the sequential combustion chamber is equipped with an enlargement in cross-section of the flow channel contour, relative to a cross-section of the flow channel contour at an axial location between the deflection unit and the upstream section of the sequential combustion chamber, the method comprising:

combusting, in the first combustion chamber, the mixture of air and fuel at a flame temperature in between 1400 K and 1800 K to produce the combustion gas flow;

injecting, at a first location at a downstream end of the first combustion chamber, a mass flow of additional air into the combustion gas flow in order to reduce a temperature of the combustion as flow below 1400 K;

injecting, using the plurality of streamlined bodies, a mass flow of additional fuel at a second location downstream from the first location;

generating a mixture of the additional air, the additional fuel, and the combustion gas flow, the mixture having an auto ignition time between 1 ms and 10 ms;

deflecting the mixture at least in a circumferential direction using the row of guide vanes;

generating a vortices in the mixture using the vortex generating elements;

generating a reverse flow zone of the mixture as the mixture flows over the enlargement in cross-section of the flow channel contour at the upstream section of the sequential combustion chamber; and burning the mixture in the sequential combustion chamber by a combination of auto-ignition and recirculation of hot reaction products at the reverse flow zone.

2. The method according to claim 1, wherein the flame temperature is between 1550 K and 1800 K.

3. The method according to claim 1, wherein a residence time in the first combustion chamber is between 15 ms and 30 ms.

4. The method according to claim 1, wherein a residence time in the sequential combustion chamber is between 2 ms and 10 ms.

5. The method according to claim 1, wherein injecting the mass flow of additional air reduces the temperature of the combustion gas flow from the first combustion chamber to less than 1350 K.

6. The method according to claim 1, wherein the second location, at which the mass flow of additional fuel is injected, is positioned in an inlet section of the deflection unit.

7. The method according to claim 1, further comprising generating additional vortices in the mixture using the row of guide vanes, each guide vane of the row of guide vanes having a corrugated trailing edge or a lobed trailing edge to generate the additional vortices.

8. The method according to claim 1, further comprising defining a flame anchoring point at the reverse flow zone.

9. the method according to claim 8, further comprising: injecting a mass flow additional fuel into the reverse flow zone.

10. The method according to claim 1, wherein a temperature of combustion gas at an outlet of the sequential combustion chamber is at least 1800 K.

11. The method according to claim 1, wherein the sequential combustion chamber directs combustion gas to the downstream turbine blade row.

12. The method according to claim 1, wherein the first combustion chamber is a can combustion chamber and the sequential combustion chamber is an annular combustion chamber.

13. A combustor arranged in a gas turbine of a power plant, the combustor comprising, in a direction of combustion gas flow through the combustor:

a first combustion chamber;

a deflection unit provided in a flow path through the combustor, the deflection unit configured to receive combustion gas flowing from the first combustion chamber; and a sequential combustion chamber; wherein the first combustion chamber is a premix combustion chamber with at least one premix burner configured to inject a mixture of air and fuel into a combustion zone of said first combustion chamber, the fuel comprising a gaseous fuel or a liquid fuel;

the deflection unit includes a row of guide vanes configured to deflect the combustion gas flow at least in a circumferential direction, vortex generating elements, and a plurality of streamlined bodies configured to inject fuel into the combustion gas flow, wherein the deflection unit is positioned on a larger radius, relative to a turbine axis, than a radius on which a downstream turbine blade row is positioned, wherein the plurality of streamlined bodies are disposed upstream of the row of guide vanes, and wherein the vortex generating elements are arranged downstream of the row of guide vanes on a hub side and/or on a casing side of a flow channel contour, the flow channel contour defining the flow path through the combustor; and the sequential combustion chamber is an auto-ignition combustion chamber, wherein an upstream section of the sequential combustion chamber is equipped with an enlargement in cross-section of the flow channel contour, relative to a cross-section of the flow channel contour at an axial location between the deflection unit and the upstream section of the sequential combustion chamber, for forming a reverse flow zone of combustion gas.

14. The combustor according to claim 13, wherein the enlargement in cross-section comprises an expansion in cross-section of the flow channel contour of at least 10%.

15. The combustor according to claim 13, wherein the enlargement in cross-section comprises a downstream facing step of the flow channel contour.

16. The combustor according to claim 13, wherein the enlargement in cross-section forms a portion of a recessed ring channel in the flow channel contour.

17. The combustor according to claim 13, wherein at least one guide vane in the row of guide vanes comprises:
a corrugated trailing edge or a lobed trailing edge for generating vortices.

18. The combustor according to claim 13, wherein first guide vanes in of the row of guide vanes each comprise:
at least one vortex generator arranged on a trailing edge.

19. The combustor according to claim 18, wherein at least one guide vane of the first guide vanes comprises:
at least one additional vortex generator arranged on a pressure side.

20. The combustor according to claim 13, wherein the vortex generators include at least one first vortex generator formed as a tetrahedron-shaped protrusion.

21. The combustor according to claim 13, comprising:
at least one first inlet configured to inject a mass flow of additional air at a downstream end of the first combustion chamber and/or at least one second inlet configured to inject a mass flow of additional air at an inlet region of the deflection unit.

22. The combustor according to claim 21, wherein said at least one first inlet and/or said at least one second inlet are arranged on the flow channel contour.

23. The combustor according to claim 13, wherein each streamlined body of the plurality of streamlined bodies is configured to inject fuel from a trailing edge, a pressure side, or a suction side of the respective streamlined body.

24. The combustor according to claim 21, wherein the at least one first inlet and/or the at least one second inlet are arranged upstream of the plurality of streamlined bodies.

25. The combustor according to claim 13, wherein the first combustion chamber is one of an annular combustion chamber or a can combustion chamber, and wherein the sequential combustion chamber is an annular combustion chamber.

26. The combustor according to claim 25, wherein the first combustion chamber is a can combustion chamber and a plurality of deflection units are arranged around an axis of the gas turbine.

* * * * *